INVENTORS
Arthur H. Post, Jr.
Walter H. Hogan

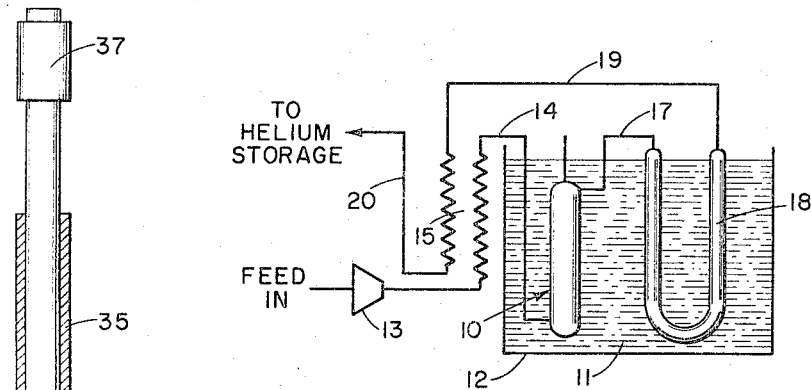
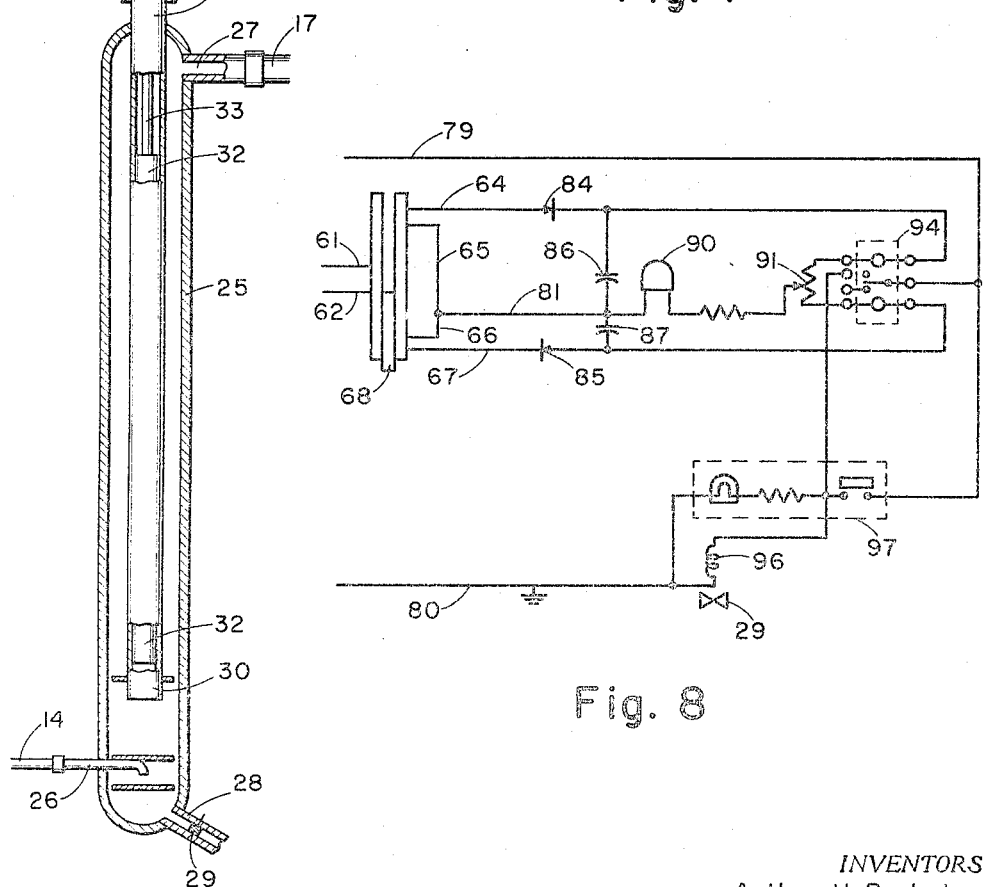

BY

Attorney

3,340,699
CRYOGENIC CONDENSER WITH LIQUID LEVEL SENSING AND CONTROL
Arthur H. Post, Jr., Belmont, and Walter H. Hogan, Wayland, Mass., assignors to Arthur D. Little, Inc., Cambridge, Mass., a corporation of Massachusetts
Filed June 11, 1965, Ser. No. 463,174
8 Claims. (Cl. 62—37)

This invention relates to a liquid level sensor and control device and more particularly to a device capable of sensing the level of a cryogenic liquid in a high-pressure condenser system in which the cryogenic liquid is separated from a gas.

Helium is a relatively rare gas, and in many cases it is economically desirable to recover the gas after use for subsequent reuse. Such recovery often leaves the helium gas contaminated with air and it becomes necessary to repurify it before it can be delivered into a refrigerator or liquefier. The purpose of a helium repurifier is then to remove contaminants and deliver pure helium gas. The repurifier is preferably operated at elevated pressures, e.g., 1800 to 2000 p.s.i.a.; first, to improve the purification capability, and second, to deliver the purified gas directly into high-pressure gas storage bottles.

Air, the primary contaminant in an air-helium gaseous mixture, under pressure will condense and liquefy at liquid nitrogen temperatures until it reaches an equilibrium vapor pressure of about one atmosphere with the liquid in the cendenser. It is therefore convenient and desirable to remove a large portion of air from contaminated helium by cooling and condensing it before passing it through activated charcoal absorbers for removal of the remaining portion of the contaminants. By removing as much air as possible from the helium prior to its introduction into the activated charcoal absorbers it is possible to minmize the load on the absorbers and thus to keep reactivation of these devices to a minimum. Liquefying of the air and condensing it are normally effected by bringing the air-helium mixture into out-of-contact heat exchange relationship with liquid nitrogen. This permits liquefying and condensing almost all of the air so the helium contains less than one percent air. This helium can then be passed through a charcoal absorber system to remove the residual air.

Certain problems arise in handling this air-helium mixture at elevated pressures, particularly in determining the buildup of liquid air level in a condenser in which it cannot be visually observed, and in discharging the liquefied air from a vessel maintained at elevated pressures. The apparatus of this invention continuously and automatically senses the level of liquid air condensed in the pressurized vessel and when the level rises to a predetermined point, actuates a discharge valve to remove most of the liquid air. A small residual amount is left in the pressure vessel to provide a liquid seal.

It is therefore a primary object of this invention to provide an improved apparatus for condensing liquid air from a cold high-pressure stream of helium and discharging the liquid air thus condensed to prevent any undesirable buildup of the liquid within the vessel or transfer of the liquid into the absorber bed. It is another object of this invention to provide apparatus of the character described which continuously senses the level of a cryogenic liquid within a pressurized vessel and which provides for automatic discharge of the liquid when it has reached a predetermined level within the vessel. It is another object to provide such apparatus which is reliable, which minimizes the load on activated charcoal traps and which permits unattended continuous operation. Other objects of the invention will in part be obvious and will in part be apparent hereinafter.

The invention accordingly comprises the features of construction, combination of elements, and arrangement of parts which will be exemplified in the construction hereinafter set forth and the scope of the invention will be indicated in the claims.

For a fuller understanding of the nature and objects of the invention, reference should be had to the following detailed description taken in connection with the accompanying drawings in which FIG. 1 is a schematic of the flow of pressurized helium in a typical helium repurifier;

FIG. 2 is a side elevational view, partially in cross-section, of a condenser having incorporated in it the liquid sensor and control apparatus of this invention;

FIG. 8 is a schematic of the control circuit which effects automatic discharge of the accumulated liquid when it has reached a predetermined level.

Figure 3:
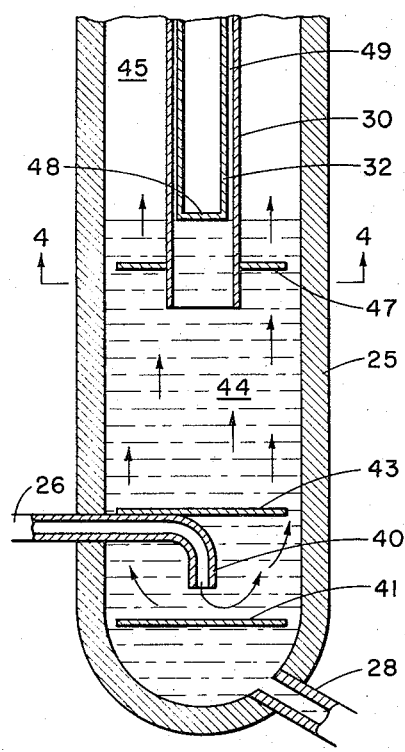
FIG. 3 is a cross-sectional detail of the lower portion of the apparatus of FIG. 2.

In the apparatus of this invention the condenser is an elongated pressure vessel into which a precooled air-helium mixture is introduced and in which the liquid air is condensed and collected. An extremely sensitive and light-weight float responsive to the level of the liquid air is used to move a small core through means which are capable of detecting the position of the core and of actuating a valve in the liquid discharge line when the liquid has reached a predetermined height. Thus the liquid level is continually monitored and controlled and the apparatus may be run continuously without attendance.

FIG. 1 is a schematic drawing showing a typical helium repurifier using the condenser of this invention. In FIG. 1 the condenser is generally indicated by the numeral 10. It is submerged in liquid nitrogen 11 contained within a properly insulated and thermally protected vessel 12. The air-helium mixture from compressor 13 is carried by conduit 14 into the condenser. This conduit 14 passes through an out-of-contact heat exchanger 15 in which the gas mixture is precooled prior to its being finally cooled by the liquid nitrogen which surrounds the conduit. The helium gas from the condenser, containing less than 1 percent air and under pressures of 1,800 to 2,000 p.s.i., is then transferred through conduit 17 into a typical activated charcoal trap 18 which, like the condenser, is submerged in liquid nitrogen. The cold purified helium is then conducted by conduit 19 into heat exchanger 15 where it gives up refrigeration to the incoming impure gas and from which it is conducted to a suitable helium storage means by way of conduit 20.

The condenser incorporating the liquid level sensing and control means of this invention is illustrated in totality, partially in cross-section, in FIG. 2. Because of the details of the apparatus, the enlarged cross-sectional drawings of FIGS. 3–7 are made in three sections. It will be seen that FIGS. 3, 5 and 7 when viewed together make up the entire detailed drawing of the condenser.

In FIG. 2 it will be seen that there is provided an elongated pressure vessel 25 serving as the primary condenser housing. This condenser housing is conveniently constructed from two-inch diameter stainless steel. However, any size condenser housing is feasible. It is of course necessary that this condenser housing 25 be formed of a material which is capable of retaining its structural strength at liquid nitrogen temperatures and that it be able to withstand the fluid pressures maintained within it. This condenser housing is of course sealed at both ends, and near the bottom on one side there is provided a fluid inlet conduit 26 which can be conveniently attached to the main conduit 14 of the repurifier system (FIG. 1). At the upper end of the pressure vessel is a helium discharge conduit 27 from which the helium gas is withdrawn. This conveniently has an adapter making it possible to readily attach it to conduit 17 (FIG. 1) which carries the helium into the charcoal absorbers 18. Located in the bottom of the main condenser housing 25 is a liquid draw-off line 28 which has a valve 29 actuated by a solenoid or other suitable device as explained in conjunction with the discussion of FIG. 8.

Within the main condenser housing 25 and extending through the top of it is a guide tube 30 formed of pressure tubing and in which a very lightweight float 32 moves up and down. This float is responsive to the level of the liquid air in the pressure vessel. A core tubing 33 is connected to the top of the float 32 and this core tubing has affixed to it a core (not shown in FIG. 2). This core in turn moves vertically within a sensing means 35 responsive to its vertical position. This sensing means in turn is used to actuate the solenoid which opens and closes valve 29. The top end of the guide tube terminates in an adapter plug 37.

Figure 4:
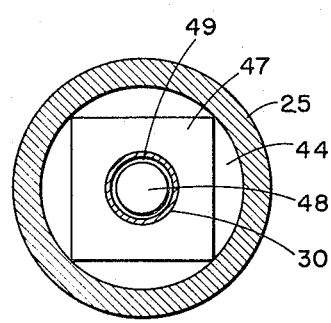
FIG. 4 is a cross-section taken along lines 4—4 of FIG. 3.

FIGS. 3 and 4 are detailed cross-sections of the lower portion of the condenser of this invention. Like reference numbers refer to like elements in all of these drawings. Fluid inlet conduit 26 enters the pressure housing 25 (through pressure-tight sealing means) and has a vertically disposed section 40 which serves to direct the incoming mixture of liquefied air and helium gas downwardly to impinge on a baffle plate 41. The purpose of this baffle plate is to prevent incoming gas from blowing out through the discharge or drain line 28 when it is open to discharge the liquid air. The discharge of helium with the liquid air is undesirable since it results in irretrievable loss of helium by this route. That portion of conduit 26 which extends internally of the pressure vessel is supported from a float support 43 which also serves to determine the lowermost position of float 32. The liquid air 44 accumulates in the bottom portion of the pressure vessel while helium diffuses through it and enters volume 45 around the guide tube from which it is withdrawn from the condenser through conduit 27. Guide tube 30 is maintained in alignment through the use of spacer 47 (see FIG. 4). Float 32 is sealed at the lower end with end plate 48 to impart the necessary buoyancy to it. The float is made from very thin-walled tubing to make it as light in weight as is feasible while still retaining its structural integrity. The external wall of the float 32 is coated with a very thin coating of polytetrafluoroethylene to minimize stick slip friction. A small clearance 49 (e.g., about an 0.025 diametrical clearance) is provided between the external wall of the float 32 and the internal wall of the guide tube 30. This is sufficient clearance to allow a small amount of liquid air to surround the float.

Figure 5:
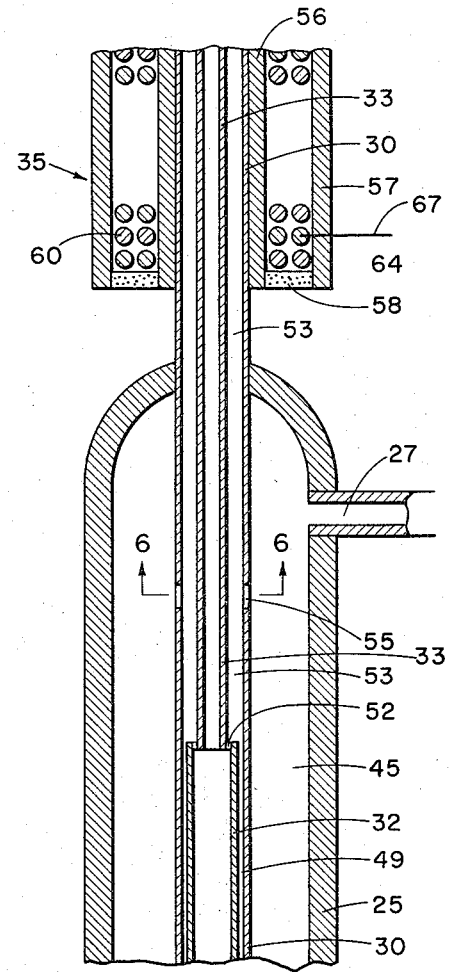
FIG. 5 is a cross-sectional detail of the middle portion of the apparatus of FIG. 2.
Figure 6:
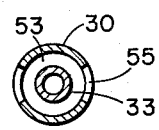
FIG. 6 is a cross-section taken along line 6—6 of FIG. 5.

FIG. 5 is a cross-sectional representation of the central portion of the apparatus. Actually it shows a portion of the means which is responsive to the float portion and in the description of this portion of the device FIG. 7 should also be consulted. The length of the float 32, as seen in FIG. 2, is less than the length of the guide tube and at its upper end it is attached to a smaller float section or core tube 33 through the top cover plate 52 of float 32. Between the external wall of the core tube 33 and the internal wall of guide tube 30 there is an annular space 53 which is vented to volume 45 through ports 55 (see FIG. 6).

Figure 7:
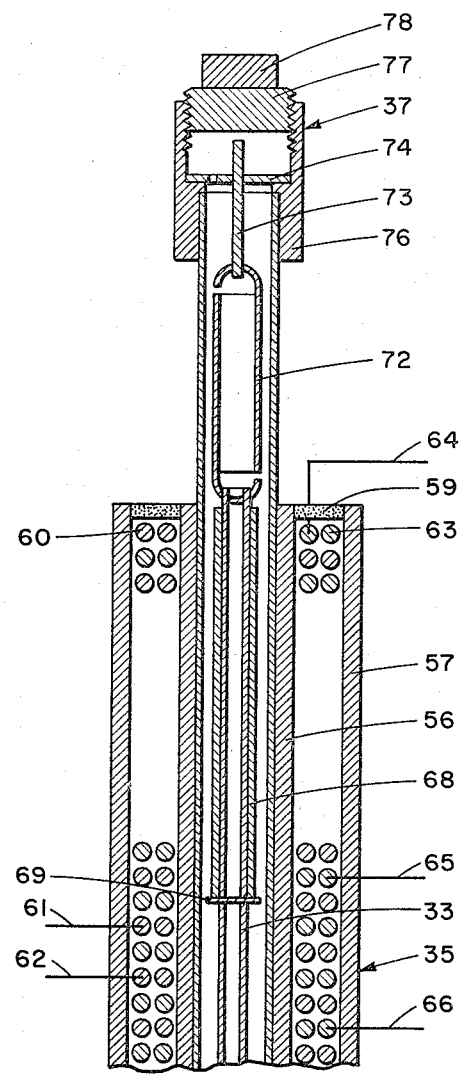
FIG. 7 is a cross-sectional detail of the upper portion of the apparatus of FIG. 2.

The means shown in FIGS. 5 and 7 used to sense the position of the float within the condenser is a linear differential transformer, a device known in the art and commercially available. It will be seen in FIGS. 5 and 7 to be comprised of a housing made up of two concentric tubes 56 and 57 sealed at the bottom and top by caps 58 and 59, respectively, which are conveniently formed-in-place epoxy resin seals. It is mounted permanently on the guide tube 30. The transformer is wound with primary and secondary coils. Associated with the primary coils 60 are input leads 61 and 62; and associated with the secondary coils 63 are output leads 64, 65, 66 and 67. The connections of these lead wires to the control circuit will be explained in conjunction with the description of the circuit shown in FIG. 8.

A magnetic core 68 is affixed to the core tube 33 by means of a pin 69 which passes through the core tube and anchors the core thereto. Core tube 33 is open at the top end to equalize the pressure inside the float with the pressure in the condenser; and it is attached through holes drilled therein to the end of a sensitive spring 72. The top end of the spring is in turn slipped through and attached to a pin 73 which is affixed to a support plate 74. This support plate in turn rests upon a flange machined into an adapter 76 sealed to the top end of the guide tube. The adapter is threaded and is sealed to be pressure-tight by means of a plug 77 having a suitable screw 78. It will be seen that when plug 77 is removed from the adapter, the entire float assembly along with the core and spring may be readily removed from the guide tube and reinserted.

FIG. 8 shows one circuit suitable for connecting the linear differential transformer into the system. Primary input leads 61 and 62 are connected to a suitable power supply (not shown) and solenoid 96 is likewise connected through leads 79 and 80 to a suitable power supply (not shown). The leads 65 and 66 from the secondary transformer coils feed to a common lead 81 and then into meter 90. Leads 64 and 67 are likewise connected through rectifiers 84 and 85, and condensers 86 and 87 to meter 90. Meter 90 is in turn connected through an adjustable potentiometer to a sensitive relay 94 which actuates solenoid 96. Finally, a display switch 97 is provided for manually actuating the blowdown valve 29 (FIG. 1). The core 68 in moving vertically within the transformer determines the flow of current therethrough, and the system is designed so that when current reaches relay 94 through lead wire 64 to energize one coil of the relay, it remains held in its energized condition by a magnetic latch until the current in lead wire 67 reaches the same energy level, at which time it energizes the other coil of the relay to overcome the force exerted by the first magnetic latch. Thus the valve 29 (FIG. 2) which is actuated by the solenoid 96 remains open until the core and hence the level of liquid air has dropped to a predetermined point.

It is of course within the scope of this invention to use any other means whether electromagnetic or otherwise to detect the position of the core and to employ such means automatically to actuate the solenoid and discharge valve. As an alternative to the linear differential transformer illustrated in the drawings we may use for example a photo-optical system. Two sets of small quartz windows, the windows in each set being diametrically opposite to each other are placed in the guide tube. The sets are positioned at points corresponding to the extreme positions of the core which also contains a slot aligned with the windows in the sets. When the core is at its lowermost and uppermost positions, light can be directed through the windows and slot to actuate a suitable optically sensitive device (e.g., a photosensitive diode or photocell) which in turn actuates the solenoid.

The operation of the apparatus of this invention is as follows. When there is no liquid air in the condenser, or when the level is no higher than the float support 43 (FIG. 3) the weight of the float and core is sufficient to stretch the spring to the extent that the bottom of the float rests on the float support 43. As the liquid level rises it begins to submerge the float. The resulting displacement begins to provide buoyancy for the float and the spring contributes to the upward force applied to the float. With the continued rise of the liquid level a point is reached where the balance of forces (represented on one hand by the weight of the float and on the other by the buoyancy created by the liquid and pull of the spring) is shifted and the spring is able to pull the float upwardly. As an example of the relationship of core travel to liquid level we may cite that for a 2-inch O.D. condenser and 5⁄8 inch O.D guide tube where the condenser is 23 inches long and the guide tube extends 12 inches above it, a total travel of about 3 inches for the core is equivalent to about a 12-inch change in level of liquid air.

When the core reaches its uppermost position the circuit of FIG. 8 is in condition to actuate the solenoid and open the discharge valve. This valve remains open until the liquid level returns to just below the float support due to the relay used. By retaining a small quantity of liquid air in the condenser there is always provided an internal liquid seal to prevent the loss of valuable helium gas.

The condenser of this invention, with the liquid level sensor and controlling mechanism, provides an efficient apparatus for separating air and other contaminants from helium under pressure. The apparatus has successfully reduced the air in an air-helium mixture from 50 percent to less than 1 percent. The condenser is capable of reliably handling helium at elevated pressures and of automatically limiting the buildup of liquid air. The apparatus may be permitted to run continuously without attendance.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A condenser adapted to separate a cryogenic liquid mixed with a gas under pressure and to discharge said liquid while maintaining said gas under pressure, comprising in combination
   (a) an elongated pressure vessel having fluid inlet means, gas discharge means and liquid discharge means;
   (b) valve means associated with said liquid discharge means;
   (c) pressure tubing within said pressure vessel and extending externally of said vessel through the top of said vessel;
   (d) a float operable within said pressure tubing and being buoyantly responsive to the level of said cryogenic liquid in said pressure vessel;
   (e) a detectable body associated with said float and adapted to move vertically within said pressure tubing;
   (f) spring means attached to the upper end of said pressure tubing and affixed to said float whereby said spring means bears the weight of said float and its associated elements when said float is out of contact with said liquid;
   (g) detecting means external of said pressure tubing adapted to detect the position of said body therein; and
   (h) means responsive to said detecting means adapted to actuate said valve means, whereby said valve is opened when said body occupies a position corresponding to a preset upper level of said cryogenic liquid and is closed when said body occupies a position corresponding to a preset lower level of said cryogenic liquid.

2. A condenser in accordance with claim 1 wherein said body is a magnetic core affixed to said float through an extension of said float and said detecting means is a linear differential transformer.

3. A condenser in accordance with claim 1 wherein the external surface of said float is coated with friction-reducing film.

4. A condenser in accordance with claim 1 wherein said fluid inlet means is a conduit which extends into said pressure vessel and has a vertically disposed section adapted to direct said fluid downwardly against a baffle plate, said baffle plate being positioned above said liquid discharge means.

5. A condenser in accordance with claim 1 wherein the top end of said pressure tubing is sealed with a removable plug adapter.

6. A condenser adapted to separate a cryogenic liquid mixed with a gas under pressure and to discharge said liquid while maintaining said gas under pressure, comprising in combination
   (a) an elongated pressure vessel adapted to be immersed in a cryogenic liquid and having a fluid inlet means extending internally of said vessel and adapted to direct said fluid downwardly into said vessel, gas discharge means and liquid discharge means;
   (b) a baffle plate arranged to have said fluid impinge thereon and positioned above said liquid discharge means;
   (c) valve means associated with said liquid discharge means;
   (d) guide tube means formed of pressure tubing within said pressure vessel and extending externally of said vessel through the top of said vessel;
   (e) a float operable within said guide tube and defining with the internal surface of said guide tube a small annular liquid passage, said float being buoyantly responsive to the level of said cryogenic liquid in said pressure vessel;
   (f) a core tube affixed to the upper end of said float;
   (g) a magnetic core mounted on the upper portion of said core tube;
   (h) spring means attached to said core tube and affixed to the upper end of said guide tube whereby said spring means bears the weight of said float, said core tube and said core when said float is out of contact with said liquid;
   (i) a linear differential transformer surrounding at least a part of that portion of said guide tube external of said pressure vessel, said transformer being adapted to detect the position of said magnetic core; and
   (j) relay circuit means including valve actuating means connected to said transformer and responsive to the position of said core, whereby said valve is opened when said core occupies a position corresponding to a preset upper level of said liquid and is closed when said core occupies a position corresponding to a preset lower level of said cryogenic liquid.

7. A condenser in accordance with claim 6 further characterized by having a float support arranged to define the lowermost position of said float.

8. A helium repurifier adapted to remove contaminants from helium gas under pressure comprising a condenser as set forth in claim 6 and a charcoal absorber means immersed in liquid nitrogen.

References Cited

UNITED STATES PATENTS

| | | | |
|---|---|---|---|
| 1,876,551 | 9/1932 | Barstow et al. | 62—37 X |
| 2,026,299 | 12/1935 | Boyd. | |
| 2,720,785 | 10/1955 | Sedgwick. | |
| 2,768,703 | 10/1956 | Parks | 62—37 X |
| 2,903,678 | 9/1959 | Wilk | 73—313 X |
| 3,254,496 | 6/1966 | Roche et al. | 62—23 X |

OTHER REFERENCES

The Production of Temperatures Below 1K by Pumping Liquid Helium Vapour Using Adsorption Pumps, B. N. Eselson, Cryogenics, September 1962, pp. 279–280.

NORMAN YUDKOFF, *Primary Examiner.*

V. W. PRETKA, *Assistant Examiner.*